United States Patent [19]

Sawada et al.

[11] Patent Number: 4,590,081
[45] Date of Patent: May 20, 1986

[54] METHOD OF MANUFACTURING FOAMED FOODSTUFF

[75] Inventors: Takehiko Sawada, Kawasaki; Masanori Miyazawa; Noriyuki Kikuchi, both of Yokohama, all of Japan

[73] Assignee: Ikegai Tekko Kabushiki Kaisha, Tokyo, Japan

[21] Appl. No.: 672,252
[22] PCT Filed: Mar. 1, 1984
[86] PCT No.: PCT/JP84/00073
 § 371 Date: Oct. 26, 1984
 § 102(e) Date: Oct. 26, 1984
[87] PCT Pub. No.: WO84/03420
 PCT Pub. Date: Sep. 13, 1984

[30] Foreign Application Priority Data
 Mar. 2, 1983 [JP] Japan .................................. 58-34187

[51] Int. Cl.$^4$ ............................................. A23P 1/12
[52] U.S. Cl. .................................................. 426/448
[58] Field of Search ............... 426/564, 571, 447, 448, 426/449; 366/85

[56] References Cited
U.S. PATENT DOCUMENTS

| 2,120,138 | 6/1938 | Mathews et al. | 426/448 |
| 3,117,006 | 1/1964 | Wenger | 426/448 |
| 3,203,370 | 9/1962 | Haug et al. | 366/85 |
| 4,438,146 | 3/1984 | Colby et al. | 426/448 |

OTHER PUBLICATIONS

Primary Examiner—Raymond N. Jones
Assistant Examiner—Carolyn Paden
Attorney, Agent, or Firm—Murray and Whisenhunt

[57] ABSTRACT

A method of manufacturing a foamed foodstuff by inserting powdered and granular ingredients for a foodstuff into an extruder which is provided with two screws which mesh with each other and rotated at high speed in the same direction, mixing and heating the ingredients in a preheating zone, adding a predetermined quantity of a liquid to the mixed ingredients in a liquid-addition zone, kneading the moistened ingredients in a kneading zone, transforming the starch in the ingredients into alpha starch in an alpha formation zone, and then extruding the ingredients from the extruder.

2 Claims, 1 Drawing Figure

METHOD OF MANUFACTURING FOAMED FOODSTUFF

TECHNICAL FIELD

This invention relates to a method of manufacturing a foamed foodstuff by using powdered and granular ingredients.

BACKGROUND ART

The art of manufacturing foamed foodstuff by processing powdered and granular ingredients using a screw extruder is well know. In the prior art the ingredients must be added with a liquid and fully kneaded before the ingredients are inserted in the extruder. Therefore, the prior art necessitated a separate conventional kneader, in addition to an extruder, which is a troublesome manual operation. Further, as the ingredients are slurry-like, it is difficult to heat the ingredients uniformly in the extruder and to obtain homogeneous products. Further, the prior art has the disadvantage that when slowing down the rotation speed of the screw for the purpose of avoiding the foregoing problem, e.g. uniform heating, not only the productive efficiency decreases but also the residence time in the extruder is prolonged, such it is difficult to control the degree of conversion of the starch in the ingredients to the alpha formation thereof. Consequently the ingredients must be extruded as-half cooked from the extruder, and thereafter the ingredients must be baked in the oven for the purpose of foaming.

The object of this invention is to provide a method of manufacturing a foamed foodstuff wherein the above mentioned drawbacks inherent in the usual manufacturing method are eliminated; the prior art operation of kneading the ingredients prior to extrusion and the requirement for a conventional kneader are eliminated; the mixing and heating of the ingredients, addition of a liquid, kneading and heating of the ingredients and the required conversion of the starch to the alpha form thereof are carried out in the same cylinder of a single extruder which operations are successively and automatically performed to achieve a high productive efficiency; and further, the obtained products which are homogenous and of a uniform expansion.

DISCLOSURE OF INVENTION

This invention is designed so that an extruder provided with two screws, which mesh together and rotate at high speed in the same direction, is used; powdered and granular ingredients for a foodstuff are fed to said extruder and conveyed by said screws; during the passage of the ingredients through the extruder, the ingredients are mixed and heated in a preheating zone thereafter a predetermined quantity of a liquid is added to the mixed ingredients in a liquid-addition zone; the ingredients with the added liquid are kneaded and heated in a following kneading zone, and the kneaded ingredients are subjected to conditions where the starch is converted to the gelantinized (alpha) form thereof in an alpha formation zone; and thereafter said ingredients are extruded from the extruder.

According to this invention as described above, there is no necessity of kneading the powdered and granular ingredients with the added liquid prior to feeding to the extruder by virtue of another device and operation. The above mentioned kneading operation together with the preceding heat-mixing operation and the successive operations of conversion of the starch to the alpha form thereof are carried out continuously as well as automatically by the action of two screws which rotate at high speed in the same direction while meshing each other in the same cylinder of the extruder, whereby the kneading and heating operations are carried out uniformly for producing homogeneous products in a high efficiency. The degree of alpha formation can be controlled readily, and further the inside of the cylinder is subjected to self-cleaning by the screws.

BEST MODE OF CARRYING OUT INVENTION

Figure 1:
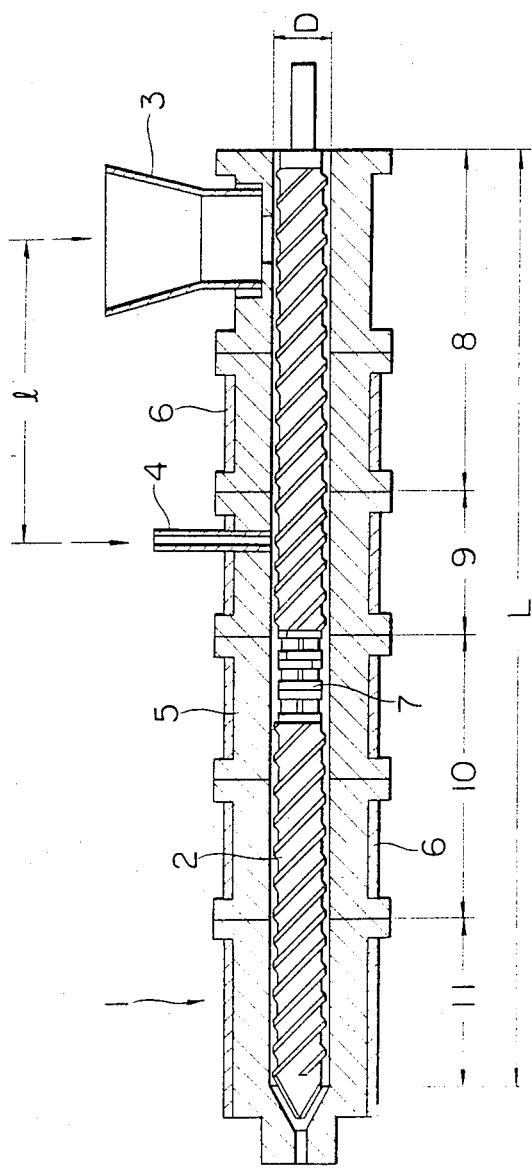
FIG. 1 is a vertical side view in partial cross section of the extruder used in the method of manufacturing a foamed foodstuff according to this invention.

In FIG. 1, reference numeral 1 denotes an extruder. This extruder 1 includes a cylinder 5 formed by combining 6 cylinder blocks, two screws 2 (one screw being shown in the drawing), a hopper 3 provided at the rear of said cylinder 5 and a liquid injection nozzle 4 located in front of said hopper.

In the above mentioned extruder, the screws 2 may be provided with one or multi-screw threads having a meshing angle of 40°–65° and further may comprise the combination of some divided ones, and are arranged to be rotated at 100–300 rpm in the same direction by the action of a conventional driving means (not shown in the drawing). In addition, screws 2 are provided with a kneading member 7 in the middle of the screw thread located in the front of the nozzle 4.

The screws 2 have a ratio of length L to diameter D (L/D ratio) of 10–18, and are provided with a pre-heating zone 8, a liquid-addition zone 9, a kneading zone 10 and an alpha formation zone 11. On the outer periphery of the cylinder 5 there is provided a heater 6 which is designed to maintain the zone 8 at 60°–100° C., the zone 9 at 80°–90° C., the zone 10 at 120°–130° C. and the zone 11 at 150°–200° C. The extruder illustrated in FIG. 1 may be constructed, as described above, of a desired number of heater blocks other than the six blocks shown in the drawing.

The distance l between the hopper 3 and the nozzle 4 desirably is held at $D \times (3-6)$.

On manufacturing a foamed foodstuff using the above mentioned extruder, powdered and granular ingredients are inserted through the hopper 3 in the cylinder 1. The ingredients are driven by the screws 2 and mixed in the preheating zone 8 while being heating to a temperature of 60°–100° C. The thus mixed ingredients are conveyed to the liquid-addition zone 9 where a predetermined quantity of a liquid from the nozzle 4 is added. These ingredients are heated to 80°–90° C. in the zone 9 and then to 120°–130° C. in the kneading zone 10, during which these ingredients are kneaded by means of the screw threads and the kneading member 7 into a slurry state and conveyed to the alpha formation zone 11. The slurry-like ingredients are heated in this alpha formation zone 11 to a temperature of aforesaid 150°–200° C. which is above the liquid boiling temperature, whereby the starch contained in the ingredients is subjected to alpha formation and at this time the liquid vapor causes an elevated pressure to be exerted in the mixture. The ingredients are discharged from the extruder 1, while holding this elevated pressure in the mixture, to the atmosphere, and the mixture (now cooked to a foodstuff) is foamed by the flashing of the pressurized liquid vapor.

EXAMPLE

Ingredients comprising wheat flour, sugar, common salt and liquid (weight ratio 3%) were inserted in the extruder 1 wherein the screws (D=46 mm, L/D=15) were rotated at the speed of rotation of 220–250 rpm in the cylinder 5 (l=D×3) and the temperatures of the zones 8, 10 and 11 were raised to 80°, 130° and 180° C. respectively. Thus, products were obtained, the expansion ratio of which was uniform and 3 times the unexpanded volume of the ingredients, and in good yields of between 60–70 kg/hr.

Industrial Usability

The method of manufacturing foamed foodstuff according to this invention is usably applicable to the food industry, in particular the confectionery industry.

We claim:

1. A method of continuously manufacturing a foamed foodstuff which comprises the steps of continuously introducing powdered and granular starch containing food ingredients into an extruder having a cylinder and two screws which mesh with each other and conveying said ingredients through said extruder by rotating the screws at speeds of between 100 and 300 rpms in the same direction, heating the conveyed ingredients to a temperature of 60°–100° C. in a preheating zone of the extruder thereby continuously mixing the ingredients, adding a predetermined quanity of a liquid to the mixed ingredients in a succeeding liquid-addition zone of the extruder which zone is heated to a temperature of 80°–90° C., heating the moistened ingredients to a temperature of 120°–130° C. in a succeeding kneading zone of the extruder while kneading the moistened ingredients into a slurry state, heating the said kneaded ingredients to a temperature of 150°–200° C. in a succeeding zone of the extruder to transform the starch contained in the mixture into gelatinized starch, and then extruding the ingredients from the extruder into the atmosphere wherein the extrudate is foamed to produce a foamed foodstuff.

2. A method of manufacturing a foamed foodstuff according to claim 1 wherein said extruder has the ratio of length L to diameter D in the range of 10–18 and the screws are rotated in the range of 100–300 rpm.

* * * * *